United States Patent
Karpov

(10) Patent No.: US 10,135,754 B2
(45) Date of Patent: Nov. 20, 2018

(54) METHOD FOR COORDINATING WEB COMMUNICATIONS

(71) Applicant: YANDEX EUROPE AG, Lucerne (CH)

(72) Inventor: Victor Vladimirovich Karpov, Moscow (RU)

(73) Assignee: Yandex Europe AG, Lucerne (CH)

( * ) Notice: Subject to any disclaimer, the term of this patent is extended or adjusted under 35 U.S.C. 154(b) by 490 days.

(21) Appl. No.: 15/026,292

(22) PCT Filed: Mar. 5, 2015

(86) PCT No.: PCT/IB2015/051629
§ 371 (c)(1),
(2) Date: Mar. 31, 2016

(87) PCT Pub. No.: WO2016/030770
PCT Pub. Date: Mar. 3, 2016

(65) Prior Publication Data
US 2016/0241488 A1 Aug. 18, 2016

(30) Foreign Application Priority Data
Aug. 29, 2014 (RU) ................................ 2014135291

(51) Int. Cl.
*G06F 15/16* (2006.01)
*H04L 12/927* (2013.01)
(Continued)

(52) U.S. Cl.
CPC ........ *H04L 47/803* (2013.01); *G06F 17/3089* (2013.01); *G06F 17/30309* (2013.01);
(Continued)

(58) Field of Classification Search
CPC .......... H04L 29/08081–29/0809; H04L 67/02; G06F 17/30; G06F 17/30008–17/30011;
(Continued)

(56) References Cited

U.S. PATENT DOCUMENTS 6,138,158 A * 10/2000 Boyle .................... H04L 67/02
709/206
6,748,420 B1 * 6/2004 Quatrano .......... G06F 17/30873
707/E17.111

(Continued)

OTHER PUBLICATIONS

International Search Report from PCT/IB2015/051629, dated Jun. 29, 2015, Shane Thomas.
(Continued)

*Primary Examiner* — Brendan Y Higa
(74) *Attorney, Agent, or Firm* — BCF LLP

(57) ABSTRACT

Method for coordinating web communications, executable at a browser coordination server in communication with a first electronic device and a second electronic device via a network, first electronic device executing a first browser and second electronic device executing a second browser, comprising receiving, from first electronic device, an indication that first browser obtained a first version of a web resource from a web server; receiving, from second electronic device, an indication that second browser obtained a second version of web resource from web server; determining that second version of web resource is an updated version of web resource relative to first version of web resource; and sending, to first electronic device, an indication that first version of web resource is out of date. Also described is a non-transitory computer-readable medium storing program instructions executable by a browser coordination server to carry out the method.

20 Claims, 8 Drawing Sheets

(51) Int. Cl.
  *H04L 29/08* (2006.01)
  *G06F 17/30* (2006.01)
(52) U.S. Cl.
  CPC .... *G06F 17/30861* (2013.01); *H04L 29/0809* (2013.01); *H04L 67/02* (2013.01); *H04L 67/34* (2013.01)
(58) Field of Classification Search
  CPC ........... G06F 17/30017; G06F 17/3023; G06F 17/30309; G06F 17/30861
  See application file for complete search history.

(56) References Cited

U.S. PATENT DOCUMENTS

| | | | |
|---|---|---|---|
| 6,785,708 | B1 | 8/2004 | Busey et al. |
| 8,090,776 | B2* | 1/2012 | Torres ................ G06F 17/3089 709/204 |
| 8,225,191 | B1 | 7/2012 | Kalman |
| 8,543,608 | B2* | 9/2013 | Koul ...................... H04L 69/28 707/734 |
| 8,990,678 | B2* | 3/2015 | Bedingfield, Sr. .......................... G06F 17/3089 707/E17.116 |
| 9,158,845 | B1* | 10/2015 | Reddy ............... G06F 17/30864 |
| 10,037,384 | B2* | 7/2018 | Ma .................... G06F 17/30867 |
| 2002/0095469 | A1* | 7/2002 | Laux ....................... H04L 29/06 709/207 |
| 2003/0105812 | A1 | 6/2003 | Flowers et al. |
| 2003/0204561 | A1 | 10/2003 | Briscoe et al. |
| 2006/0253489 | A1 | 11/2006 | Kahn et al. |
| 2011/0066709 | A1* | 3/2011 | Khurana ............. H04L 67/2842 709/222 |
| 2011/0231478 | A1 | 9/2011 | Wheeler et al. |
| 2011/0302285 | A1 | 12/2011 | D'Angelo et al. |
| 2013/0318208 | A1 | 11/2013 | Seshadri et al. |
| 2014/0259147 | A1* | 9/2014 | L'Heureux ............. H04L 63/02 726/14 |
| 2014/0310372 | A1* | 10/2014 | Zhao ................... H04L 67/2842 709/213 |
| 2014/0337405 | A1* | 11/2014 | Athas ...................... H04L 67/26 709/203 |
| 2015/0039999 | A1* | 2/2015 | Chasman ................ H04L 67/10 715/234 |
| 2015/0046915 | A1* | 2/2015 | Oliver ...................... G06F 8/65 717/170 |
| 2015/0347615 | A1* | 12/2015 | McGushion ...... G06F 17/30867 715/234 |

OTHER PUBLICATIONS

International Preliminary Report on Patentability from PCT/IB2015/051629, dated Feb. 2, 2016, Abdullahi Salad.
The Future of the Web: HTML5 Web Sockets; http://ricsmith.sys-con.com/node/677813/mobile; retrieved on Feb. 24, 2016; 2008 SYS-CON Media; pp. 1-6.
Deolasee et al.; Adaptive Push-Pull: Disseminating Dynamic Web Data; http://www-ccs.cs.umass.edu/~krithi/web/WWW10/www10/; WWW10, May 1-5, 2001, Hong Kong; retrieved on Feb. 24, 2016; pp. 1-24.
Grogirik, Nginx & Comet: Low Latency Server Push, https://www.igvita.com/2009/10/21/nginx-comet-low-latency-server-push/, Oct. 21, 2009; pp. 1-5; retrieved on Feb. 24, 2016.
Using Node.js as an access point for mobile application API, http://stackoverflow.com/questions/10906543/using-node-is-as-an-access-point-for-mobile-application-api; retrieved on Feb. 24, 2016.
Lubbers; How HTML5 Web Sockets Interact With Proxy Servers, http://www.infoq.com/articles/Web-Sockets-Proxy-Servers, retrieved on Feb. 24, 2016, Mar. 16, 2010, pp. 1-28.
NGiNX_HTTP_Push_Module, https://pushmodule.stact.net/, retrieved on Feb. 24, 2016, pp. 1-8.

* cited by examiner

METHOD FOR COORDINATING WEB COMMUNICATIONS

CROSS-REFERENCE

The present application claims priority to Russian Patent Application No. 2014135291, filed Aug. 29, 2014, entitled "METHOD FOR COORDINATING WEB COMMUNICATIONS" the entirety of which is incorporated herein.

FIELD

The present technology relates to computer-implemented methods for coordinating web communications.

BACKGROUND

Web browsers are used to access web resources from web servers via a network such as the Internet. Conventionally, navigation of web resources by web browsers has operated according to a "pull" model of client-server communication, wherein the web browser (client) sends a request to a web server for a web resource (e.g. a web page or an element of a web page), and the web server then responds either by providing the requested web resource if it is available and the web browser client is authorized to access it, or by providing an error message. If the publisher of the web resource later publishes a newer version of the web resource to the web server, the web server simply makes that newer version available to web browsers that would later request it. No indication is provided to the web browser having obtained the older version of the web resource that the newer version is available. Thus, in such case, the version of the web resource obtained by the web browser (and presented to a user of the web browser) no longer corresponds to the latest published version. In some cases, this incoherence of web resource versions as between the web browser and the web server may not be problematic. But if coherence is important, the only solution under a conventional pull model of web communications is for the web browser to periodically poll (i.e. send requests) the web server so as to obtain the latest version of the web resource. Even so, the freshness of the web resource is limited to the polling period, and in many cases, the repeated polling may be wasteful of computing and network resources because the web resource may not have changed since the last request.

Various alternatives to the conventional "pull" model have been devised. At the other extreme is the "push" model of client-server communication, wherein the determination as to when a network resource is to be transmitted from the server to the client is the responsibility of the server rather than that of the client. In such a model, the client first registers with the server in respect of a resource, the server next sends an initial version of the resource, and then, every time a newer version of the resource is published, the server automatically sends ("pushes") the newer version to the client.

Relative to the "pull" model, the advantage of the "push" model is that the latest version of the resource is always provided to the client, thereby maximizing coherence between the server and the client. However, in cases where at least some incoherence is tolerable, the "push" model is wasteful of computing and network resources because it unnecessarily insists on consuming resources to provide the latest version. In the web communications context, various technologies implement the "push" model, such as the "Server Push" mechanism of the SPDY protocol, included in the Chromium project.

Carving out a middle ground, an alternative to the "push" model is the "Server Hint" mechanism of the SPDY protocol, whereby the web server provides to the web browser not the newer version of an updated web resource, but simply an indication that such updated web resource is available. This mechanism therefore allows the web browser to determine whether it is desirable to obtain the newer version (e.g. by prompting the user of the web browser) and either initiate the download of the newer version or not, in accordance with such determination. While the "Server Hint" presents a convenient balance between the "pull" and "push" models, it requires that both the web browser and the web server implement the SPDY protocol. As of August 2014, estimates are that less than 1% of websites use SPDY.

There is therefore a need for improved methods for coordinating web communications.

SUMMARY

The present technology provides computer-implemented methods and systems in which web browser activity across at least two electronic devices is monitored by a browser coordination server in communication with the electronic devices. The browser coordination server detects when a first browser executed on a first one of the electronic devices has obtained a newer version of a web resource than that obtained by a second browser on a second one of the electronic devices. The browser coordination server then notifies the second browser that the newer version is available. The present technology may be implemented without modifying web servers designed according to the conventional "pull" model of web communications.

Thus, in one aspect, various implementations of the present technology provide a method for coordinating web communications, the method being executable at a browser coordination server in communication with a first electronic device and a second electronic device via a network, the first electronic device executing a first browser and the second electronic device executing a second browser, the method comprising:

receiving, from the first electronic device, an indication that the first browser obtained a first version of a web resource from a web server;

receiving, from the second electronic device, an indication that the second browser obtained a second version of the web resource from the web server;

determining that the second version of the web resource is an updated version of the web resource relative to the first version of the web resource;

sending, to the first electronic device, an indication that the first version of the web resource is out of date.

In some implementations, the indication that the first version of the web resource is out of date comprises a trigger operable to cause the first electronic device to notify a user of the first electronic device that the first version of the web resource is out of date.

In some implementations, the indication that the first version of the web resource is out of date comprises a trigger operable to cause the first electronic device to obtain a most recent version of the web resource from the web server. In some implementations, the trigger is operable to cause the first electronic device to obtain the most recent version of the web resource from the web server only after having prompted the user whether or not to obtain the most recent version of the web resource from the web server, and receiving a positive indication from the user. In some implementations, the trigger is further operable to cause the first electronic device to display the most recent version of the web resource to the user via a display of the first electronic device only after having prompted the user whether or not to display the most recent version of the web resource.

In some implementations, the indication that the first version of the web resource is out of date comprises an indication that the second version of the web resource is obtainable from the web server.

In some implementations, the method further comprises obtaining the second version of the web resource from one of the web server and the second electronic device; and wherein sending the indication that the first version of the web resource is out of date comprises sending the second version of the web resource obtained from the one of the web server and the second electronic device.

In some implementations, the browser coordination server may observe that an even newer version of the web resource has been obtained either by the first browser or the second browser. Thus, in some implementations, the method further comprises receiving, from the first electronic device, an indication that the first browser obtained a third version of the web resource from the web server; determining that the third version of the web resource is an updated version of the web resource relative to the second version of the web resource; and sending, to the second electronic device, an indication that the third version of the web resource is obtainable from the web server. Similarly, in some implementations, the method further comprises receiving, from the second electronic device, an indication that the second browser obtained a third version of the web resource from the web server; determining that the third version of the web resource is an updated version of the web resource relative to the second version of the web resource; and sending, to the first electronic device, an indication that the third version of the web resource is obtainable from the web server.

In some implementations, the browser coordination server is a proxy server for obtaining web resources from web servers on behalf of one or more web browsers including at least one of the first web browser and the second web browser. In other implementations, the first web browser and the second web browser obtain web resources from web servers independently of the browser coordination server. Thus, in some implementations, the first browser obtained the first version of the web resource from the web server without obtaining the first version of the web resource via the browser coordination server; and the second browser obtained the second version of the web resource from the web server without obtaining the second version of the web resource via the browser coordination server. In some such implementations, the method further comprises receiving, from the first electronic device, an indication that the first browser obtained a third version of the web resource from the web server, the first browser having obtained the third version of the web resource without obtaining the third version of the web resource via the browser coordination server; determining that the third version of the web resource is an updated version of the web resource relative to the second version of the web resource; and sending, to the second electronic device, an indication that the third version of the web resource is obtainable from the web server. In some such implementations, the method further comprises receiving, from the second electronic device, an indication that the second browser obtained a third version of the web resource from the web server, the second browser having obtained the third version of the web resource without obtaining the third version of the web resource via the browser coordination server; determining that the third version of the web resource is an updated version of the web resource relative to the second version of the web resource; and sending, to the first electronic device, an indication that the third version of the web resource is obtainable from the web server.

In some implementations, the browser coordination server obtains the web resource and sends it to the first electronic device. Thus, in some implementations, the method further comprises obtaining the second version of the web resource from one of the web server and the second electronic device; and sending the indication that the second version of the web resource is obtainable from the web server comprises sending the second version of the web resource to the first electronic device.

In some implementations, determining that the second version of the web resource is an updated version of the web resource relative to the first version of the web resource comprises determining that the first browser obtained the first version of the web resource at a first time; determining that the second browser obtained the second version of the web resource at a second time later than the first time; and determining that the second version of the web resource differs from the first version of the web resource. This may be achieved by comparing browser logs of the first browser and the second browser. Thus, in some such implementations, receiving the indication that the first browser obtained the first version of the web resource comprises receiving a first browser log of the first browser; receiving the indication that the second browser obtained the second version of the web resource comprises receiving a second browser log of the second browser; and determining that the second version of the web resource differs from the first version of the web resource comprises comparing the first browser log to the second browser log. This may also be achieved by comparing hashes of the versions of the web resource. Thus, in some such implementations, receiving the indication that the first browser obtained the first version of the web resource comprises receiving a hash of the first version of the web resource; receiving the indication that the second browser obtained the second version of the web resource comprises receiving a hash of the second version of the web resource; and determining that the second version of the web resource differs from the first version of the web resource comprises determining that the hash of the first version of the web resource differs from the hash of the second version of the web resource.

In another aspect, various implementations of the present technology provide a non-transitory computer-readable medium storing program instructions executable by one or more processors of one or more electronic devices (e.g. a browser coordination server) to carry out one or more of the above-recited methods. Thus, various implementations provide a non-transitory computer-readable medium storing program instructions for coordinating web communications, the program instructions being executable by a browser coordination server in communication with a first electronic device and a second electronic device via a network, the first electronic device executing comprising a first browser and the second electronic device comprising a second browser, the program instructions being executable to effect:

reception, from the first electronic device, of an indication that the first browser obtained a first version of a web resource from a web server;

reception, from the second electronic device, of an indication that the second browser obtained a second version of the web resource from the web server;

determination that the second version of the web resource is an updated version of the web resource relative to the first version of the web resource; and sending, to the first electronic device, of an indication that the first version of the web resource is out of date.

In the context of the present specification, unless expressly provided otherwise, an "electronic device" comprises any hardware and/or software appropriate to the relevant task at hand. Thus, some non-limiting examples of electronic devices include computer processors, computer systems (one or more servers, desktops, laptops, netbooks, etc.), smartphones, and tablets, as well as network equipment such as routers, switches, and gateways.

In the context of the present specification, unless expressly provided otherwise, a "server" is one or more digital electronic devices, possibly but not necessarily including one or more processors running appropriate software, capable of receiving requests (e.g. from client devices) over a network, and carrying out those requests or causing those requests to be carried out. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included herein wherever the expression "server" is used.

In the context of the present specification, unless expressly provided otherwise, a first device should be understood to be "in communication with" a second device if each of the devices is capable of sending information to and receiving information from the other device, across any physical medium or combinations of physical media, at any distance, and at any speed. As a non-limiting example, two digital electronic device(s) may communicate over a computer network such as the Internet. As another non-limiting example, the devices may run on the same digital electronic hardware, in which case communication may occur by any means available on such digital electronic hardware, such as inter-process communication.

In the context of the present specification, unless expressly provided otherwise, the expression "computer-readable medium" is intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular filesystem, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, event type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
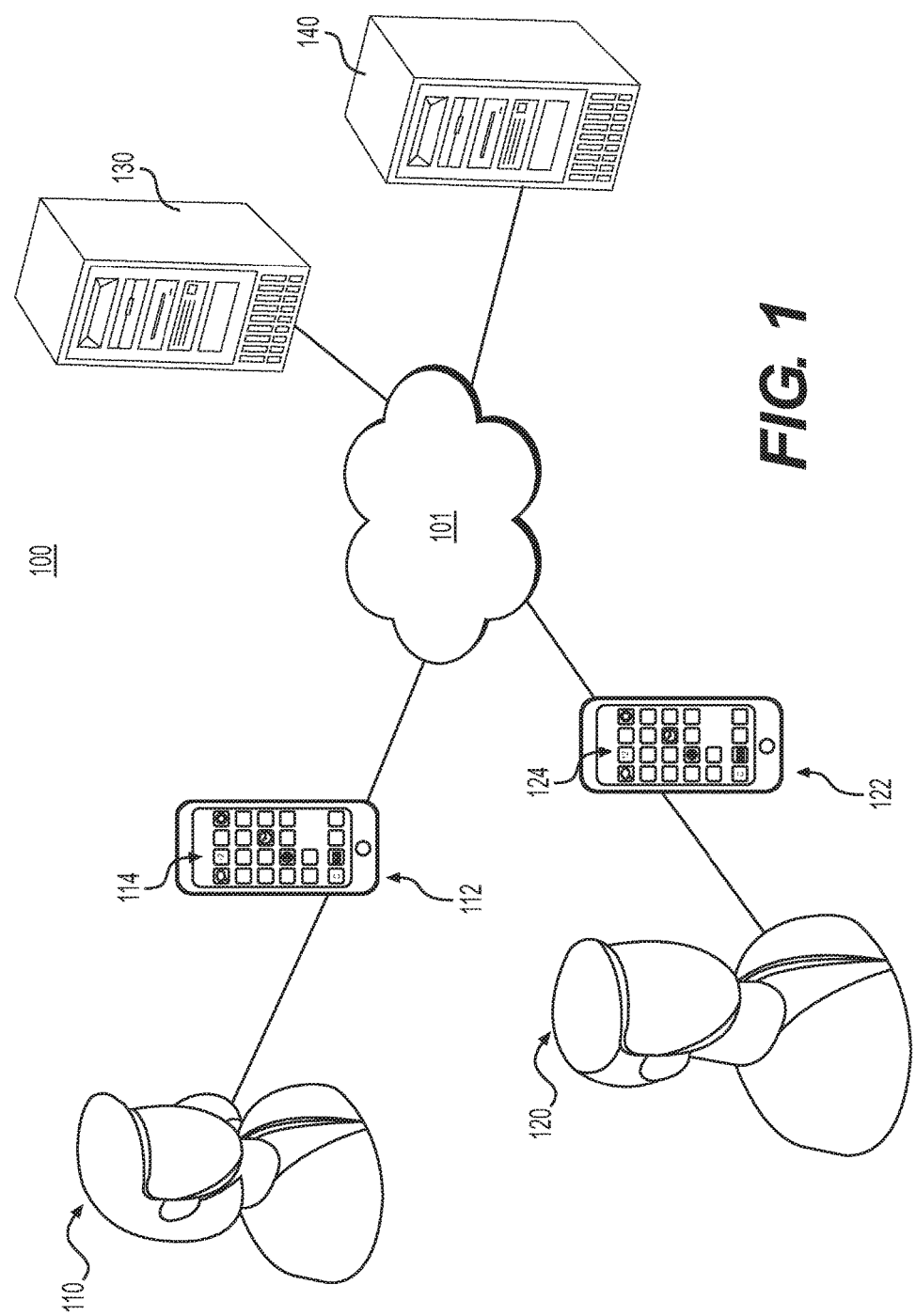
FIG. 1 is a diagram of a networked computing environment suitable for use with various implementations of the present technology.

It should be noted that, unless otherwise explicitly specified, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Beginning with FIG. 1, there is shown a networked computing environment 100 suitable for use with exemplary implementations of the present technology. The networked computing environment 100 comprises a first smartphone 112 (e.g. an Apple iPhone™ or a Samsung Galaxy S4™) with a touchscreen 114 for displaying information to a first user 110 and receiving touchscreen commands from the first user 110, a second smartphone 122 with a touchscreen 124 for displaying information to a second user 120 and receiving touchscreen commands from the second user 120, a web server 130 in communication with the smartphones 112 and 122 via a network 101 (e.g. the Internet or the like), and a browser coordination server 140 also in communication with the smartphones 112 and 122 via the network 101. Smartphones 112 and 122 are each running an operating system (e.g. Apple iOS, Google Android) which includes a web browser (e.g. Apple Safari, Google Chrome).

Though not depicted, it will be clear to those of skill in the art that smartphones 112 and 122 each comprise various hardware modules, including, along with their respective touchscreens 114 and 124, one or more single or multi-core processors, a random access memory, one or more network interfaces for communicating with the web server 130 and the browser coordination server 140 via the network 101.

Those skilled in the art will appreciate that even though that smartphones 112 and 122 are depicted as wireless computing devices, implementations of the present technology are not so limited. As such, in alternative implementations of the present technology, the smartphones 112 and 122 can be implemented as any type of electronic device, such as a personal computer (desktops, laptops, netbooks, etc.), a wireless communication device (a cell phone, a smartphone, a tablet and the like), as well as network equipment (a router, a switch, or a gateway).

While web server 130 and browser coordination server 140 are depicted as single physical computers (which by implication comprise hardware modules including one or more processors, memory, and a network interface), it will be understood by those skilled in the art that each of web server 130 and browser coordination server 140 may be implemented using a plurality of networked computers, or as one or more virtual servers running on one or more physical computers (e.g. in the cloud).

Each of the web server 130 and the browser coordination server 140 can be implemented as a conventional computer server. In an example of an implementation of the present technology, each of the web server 130 and the browser coordination server 140 can be implemented as a Dell™ PowerEdge™ Server running the Microsoft™ Windows Server™ operating system. Needless to say, each of the web server 130 and the browser coordination server 140 can be implemented in any other suitable hardware and/or software and/or firmware or a combination thereof. Even though the web server 130 and the browser coordination server 140 have been described as implemented in the similar hardware and software, this needs not to be so in every implementation of the present technology.

In some implementations of the present technology, the browser coordination server 140 is under control and/or management of the same entity that controls and/or manages and/or distributed the web browsers executed at the smartphones 112 and 122.

Figure 2:
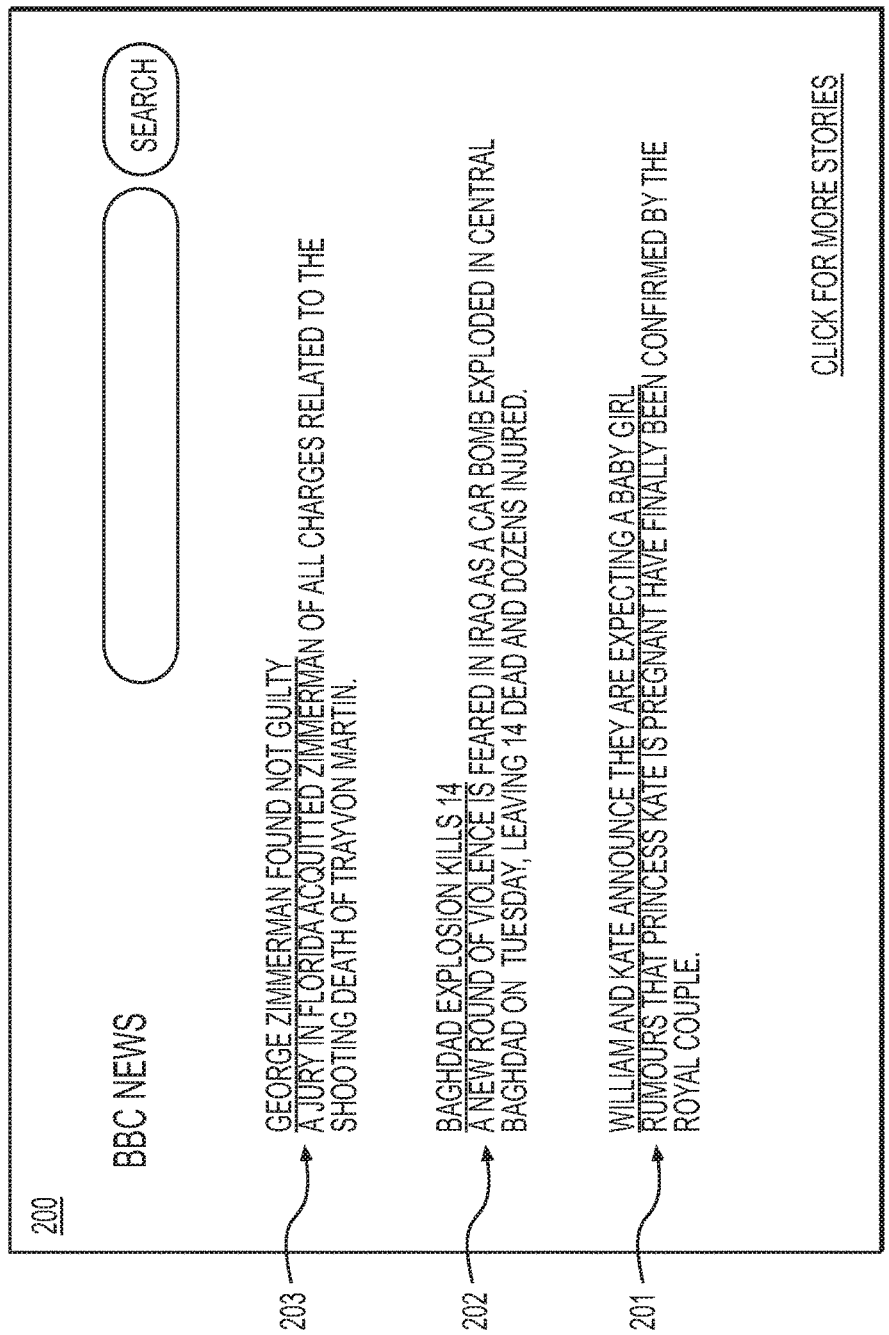
FIGS. 2 to 4 are exemplary screenshots of a web site as it may be displayed by various web browsers in the context of an exemplary implementation of the present technology.

FIG. 2 shows a screenshot of a first version of a web page 200 (the front page of the BBC News website). The first version of the web page 200 includes various elements, including hyperlinks to three news stories 201, 202, and 203.

Figure 3:
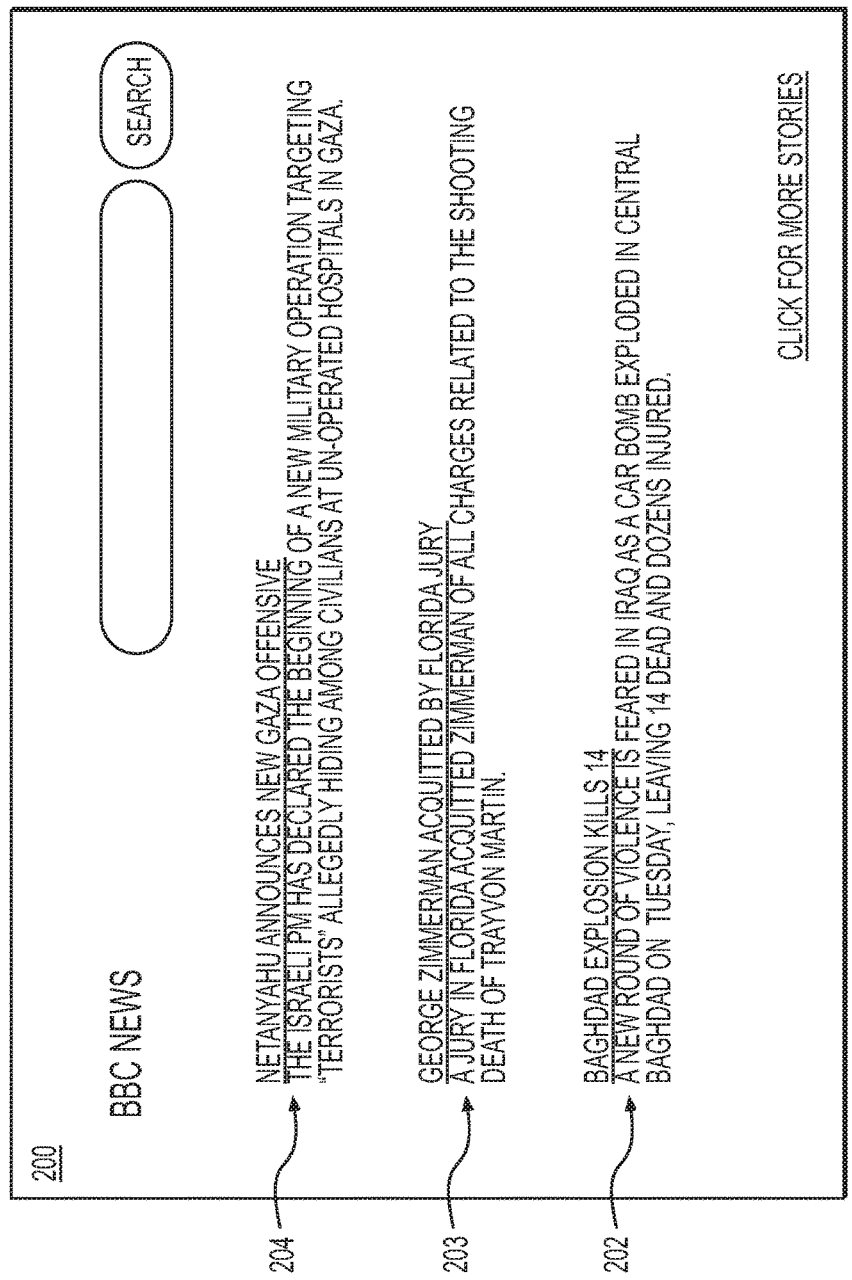

FIG. 3 shows a screenshot of a second version of the web page 200 as it may appear after having been updated relative to the first version of the web page 200 shown in FIG. 2. The second version of the web page 200 includes news stories 202, 203, and 204. Thus, the news story 204 has been added relative to the first version of the web page 200, while the news story 201 has been removed.

Figure 4:
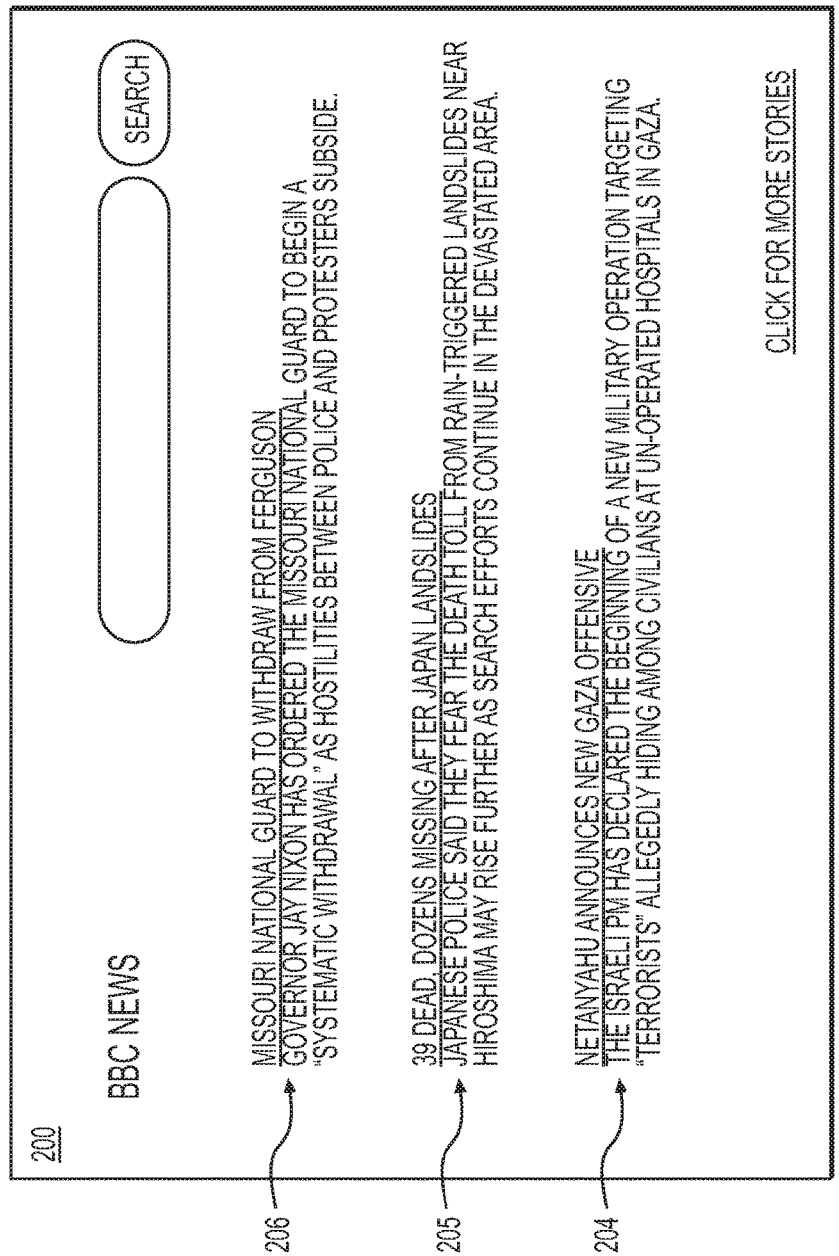

FIG. 4 shows a screenshot of a third version of the web page 200 as it may appear after having been updated once again. The third version of the web page 200 includes news stories 204, 205, and 206. Thus, relative to the second version of the web page 200 shown in FIG. 3, the third version of the web page 200 reflects the addition of the news stories 205 and 206 and the removal of the news stories 202 and 203.

Figure 5:
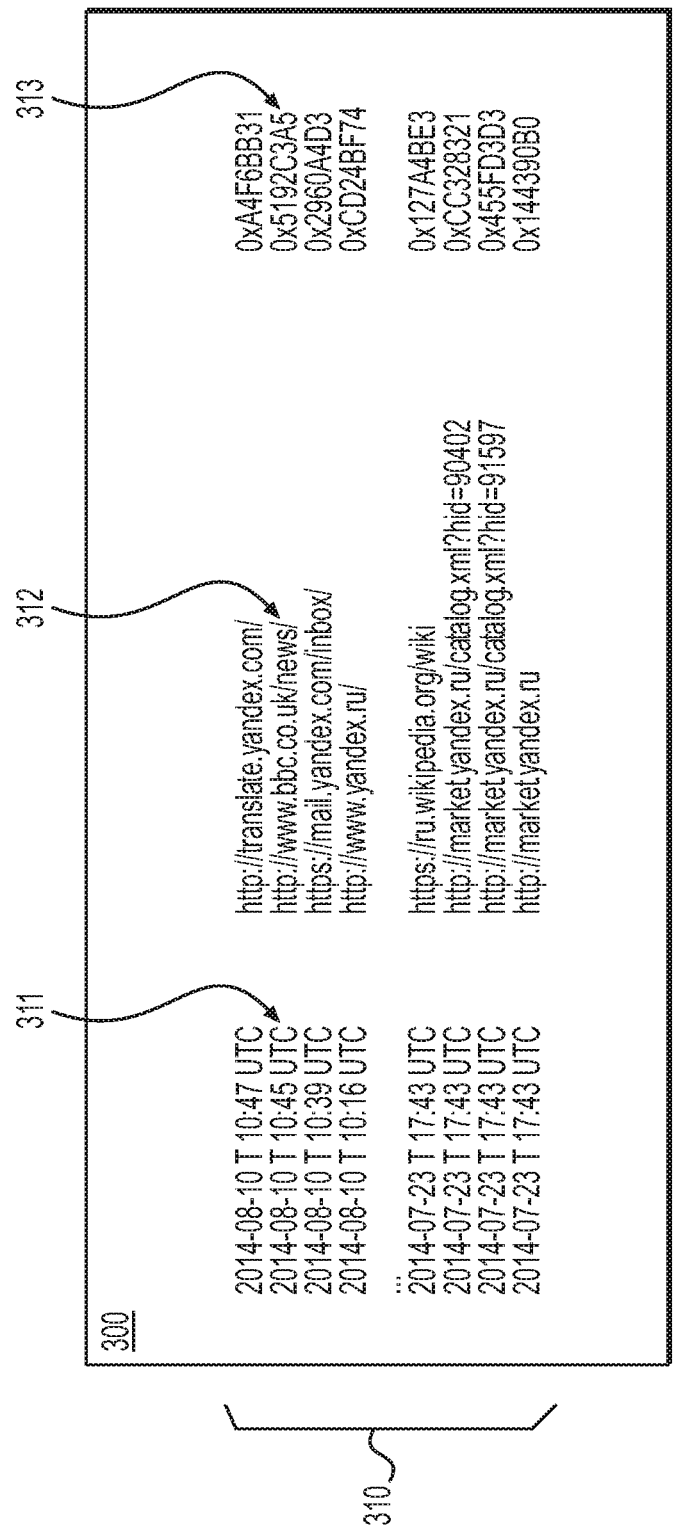
FIGS. 5 and 6 are diagrams representing browser logs of web browsers for use with an exemplary implementation of the present technology.

FIG. 5 shows a representation of a first browser log 300 of the web browser executed on first smartphone 112. The first browser log 300 includes several browser log entries 310 reflecting a history of web addresses of web pages having been visited by first user 110 using first smartphone 112. A second one of the browser log entries 310 in the first browser log 300 includes a timestamp 311 of a visit to a web address 312 which corresponds to the front page of the BBC news website (web page 200, depicted above in FIGS. 2 to 4). The second entry further includes a hash 313 of the first version of the web page 200 (i.e. that shown in FIG. 2), represented as eight hexadecimal digits (32 bits). Hashing algorithms are well-known in the art, and any suitable hashing technology may be employed in concert with the present technology. For the purposes of the present description, it suffices to note that the hash 313 is generated as an output of a hash function taking the first version of the web page 200 as input, and that virtually any change to the first version of the web page 200 would result in the hash function producing a hash value different than that of hash 313.

Figure 6:
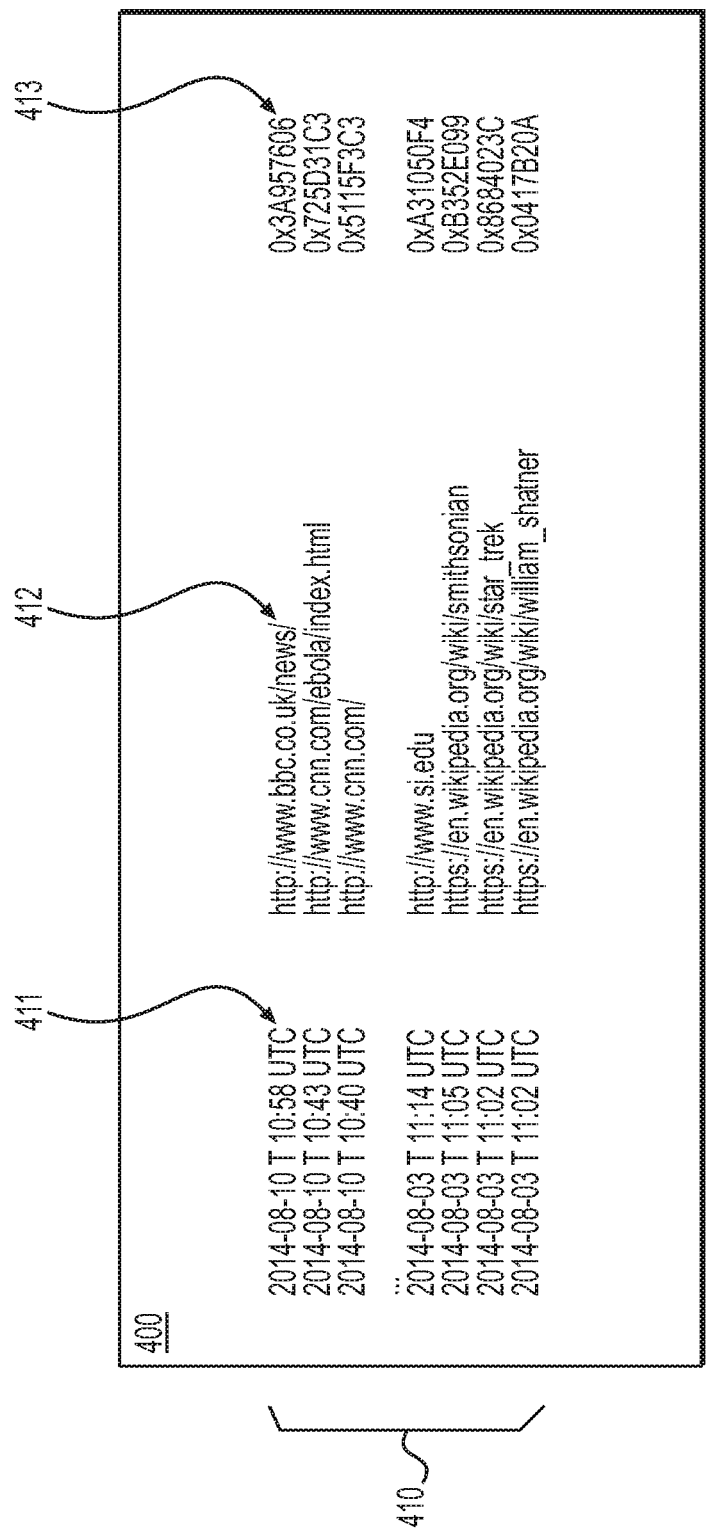

FIG. 6 shows a representation of a second browser log 400, this time of the web browser executed on second smartphone 122. The second browser log 400 includes several browser log entries 410 reflecting a history of web addresses having been visited by second user 120 using second smartphone 122. A first one of the browser log entries 410 in the second browser log 400 includes a timestamp 411 of a visit to a web address 412 which corresponds to the front page of the BBC news website (web page 200, depicted above in FIGS. 2 to 4). The first entry further includes a hash 413 of the second version of the web page 200 (i.e. that shown in FIG. 3), represented as eight hexadecimal digits (32 bits).

Figure 7:
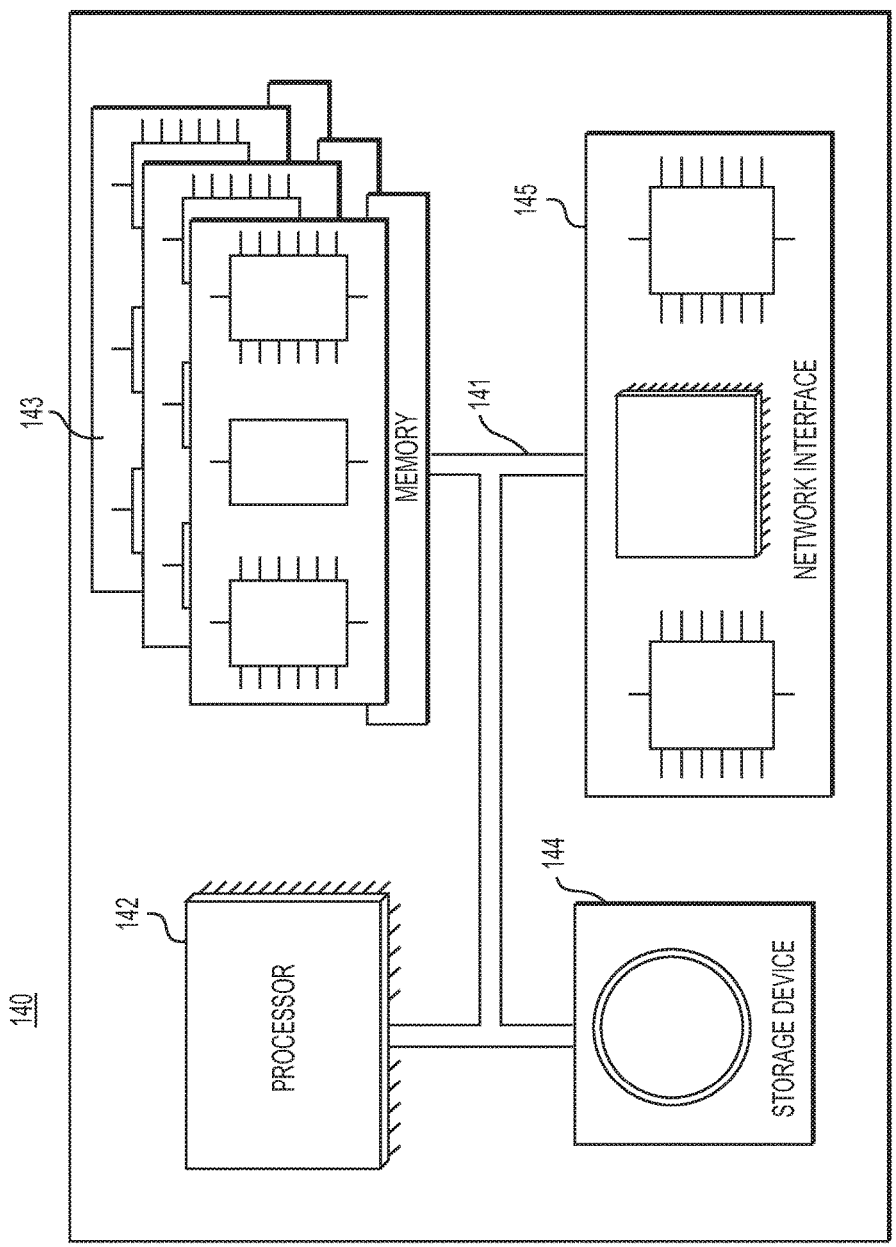
FIG. 7 is a block diagram of an implementation of a browser coordination server according to the present technology.

FIG. 7 shows a block diagram of internal hardware components of an exemplary implementation of a browser coordination server 140 such as that shown in the networked computing environment 100 of FIG. 1. The internal hardware components include a processor 142, a random access memory 143, a storage device 144, and a network interface 145. The internal hardware components may communicate with one another via one or more buses 145 (e.g. PCI, USB, or any other suitable bus technology). The network interface 145 may be coupled to the network 101 of FIG. 1.

Figure 8:
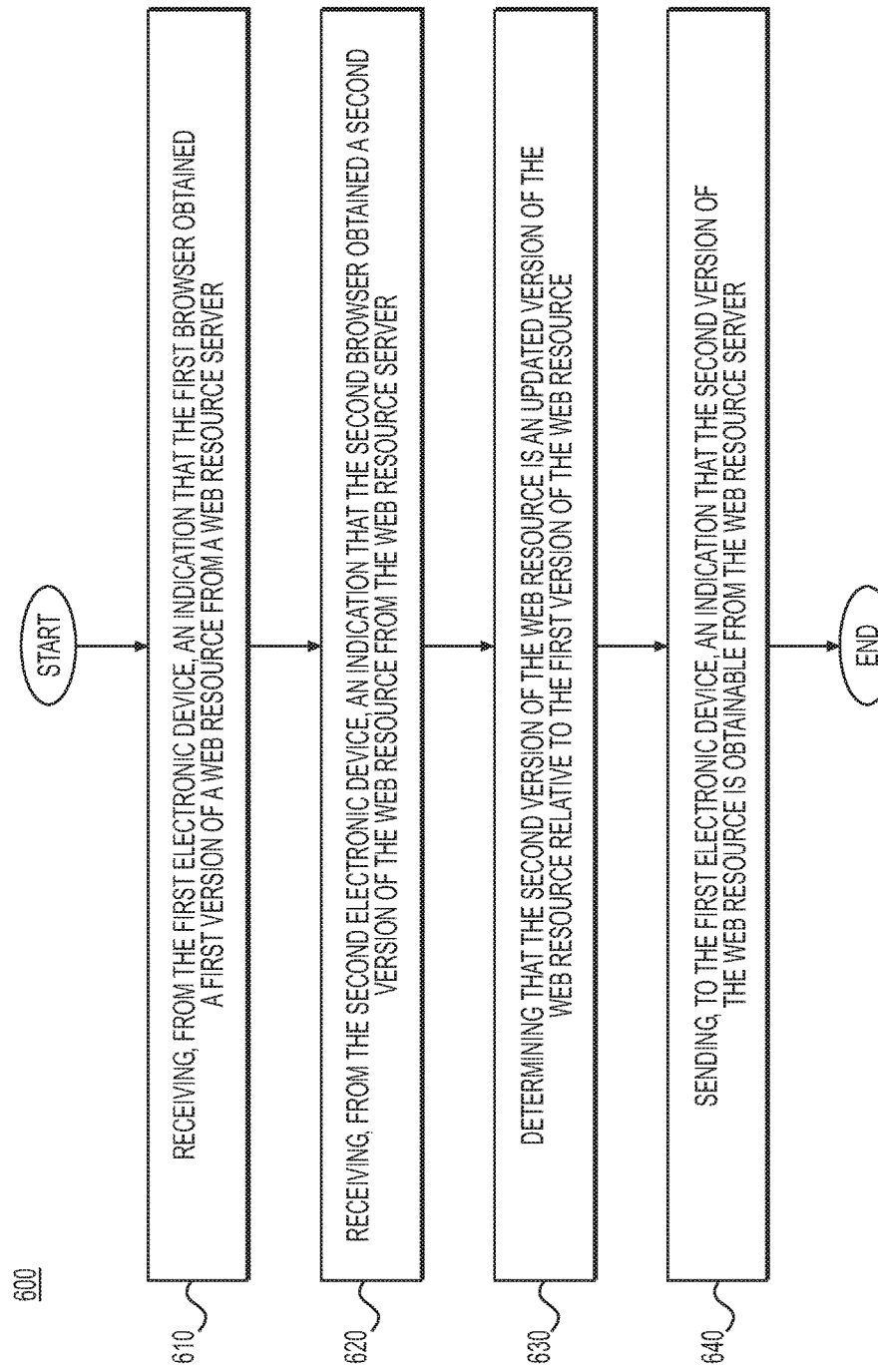
FIG. 8 is a flowchart illustrating the steps of a method implementation of the present technology.

FIG. 8 shows a flowchart illustrating the steps of an exemplary method 600 implementing the present technology. The method 600 may be carried out, for example, by the browser coordination server 140 in the context of the networked computing environment 100 of FIG. 1.

The web browser of first smartphone 112, having obtained a first version of web page 200 (i.e. that shown in FIG. 2) from the web server 130, sends an indication of such to the browser coordination server 140. For example, the indication may be the browser log 300 of FIG. 5.

Thereafter, at step 610, the browser coordination server 140 receives, via its network interface 145, the indication that the first browser (the web browser of first smartphone 112) obtained the first version of the web page 200 from the web server 130.

Later, at step 620, the browser coordination server 140 receives, via its network interface 145, an indication from the second browser (the web browser of second smartphone 122) that it has obtained a second version of the web page 200 (i.e. that shown in FIG. 3) from the web server 130. For example, the indication may be the browser log 400 of FIG. 6.

In some implementations of the present technology, steps 610 and 620 are executed as part of the routine of exchanging information between the web browsers executed by the smartphones 112 and 122 and the browser coordination server 140. Recalling that in some implementations of the present technology, the browser coordination server 140 is under control and/or management of the same entity that controls and/or manages and/or distributed the web browsers executed at the smartphones 112 and 122, the routine of exchanging information can be implemented as keeping a copy of the browsing logs by the browser coordination server 140, as an example.

In alternative implementations, the steps 610 and 620 are executed as purpose-programmed routines for exchanging information between the web browsers executed by the smartphones 112 and 122 and the browser coordination server 140, the purpose-programmed routines being implemented in accordance with implementations of the present technology.

At step 630, the browser coordination server 140 determines that the second version of the web page 200 is an updated version of the web page 200 relative to the first version of the web page 200. For example, the browser coordination server 140 may do so by comparing the browser log 300 to the browser log 400. More specifically, the browser coordination server 140 may compare a hash 313 associated with the web address 312 of the web page 200 in the browser log 300 to a hash 413 associated with the web address 412 of the web page 200 in the browser log 400 and observe that the hashes 313 and 413 differ.

The browser coordination server 140 may then compare the timestamp 311 associated with the web address 312 of the web page 200 of browser log 300 to the timestamp 411 associated with the web address 412 of the web page 200 of the browser log 400 to determine which of the first browser (the web browser of first smartphone 112) and the second browser (the web browser of second smartphone 122) obtained its version of the web page 200 most recently.

For example, the browser coordination server 140 may determine that the second version of the web page 200 is more recent than the first version of the web page 200 because the timestamp 411 is more recent that the timestamp 311. Because the second version of the web page 200 is known to be different (because hash 413 differs from hash 313) and more recent (because timestamp 411 is later than timestamp 311) than the first version of the web page 200, the browser coordination server 140 may conclude that the second version of the web page 200 is an updated version of the web page 200 relative to the first version of the web page 200.

At step 640, the browser coordination server 140 sends an indication to first smartphone 112 that the first version of the web page 200 is out of date. The web browser of first smartphone 112 may then display an indication of such on the touchscreen 114, along with a visual prompt allowing the first user 110 to decide whether or not to cause the first smartphone 112 to obtain a most recent version of the web page 200 (e.g. the second version of the web page 200, unless a yet newer version of the web page 200 has been posted by the author of the web page 200) from the web server 130. In some implementations, the indication that the first version of the web page 200 is out of date may include a trigger that is operable to cause the first smartphone 112 to obtain a most recent version of the web page 200 from the web server 130. The trigger can cause the first smartphone 112 to obtain the most recent version of the web page 200 from the web server 130 automatically, i.e. without any additional actions from the first user 110. Alternatively, the trigger can cause the first smartphone 112 to provide a prompt to the first user 110 and, responsive to a positive response from the first user 110, to cause the first smartphone 112 to obtain the most recent version of the web page 200 from the web server 130.

Alternatively, as described earlier, the browser coordination server 140 may send, as the indication that the second version of the web page 200 is obtainable, the second version of the web page 200 itself, the browser coordination server 140 having obtained it either from the web server 130 or from the second smartphone 122.

As those skilled in the art will recognize, the steps 620 to 640 may then be repeated in respect of a further indication, received from the browser of either one of the smartphones 112 and 122, that a yet newer version of the web page 200 has been obtained from the web server 130 by the one of the smartphones 112 and 122, thereby informing the other one of the smartphones 112 and 122 that the second version of the web page 200 is out of date. Moreover, like steps may be performed by the browser coordination server 140 in respect of web resources other than the web page 200 and/or in coordination with browsers of electronic devices other than smartphones 112 and 122.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for coordinating web communications, the method being executable at a browser coordination server in communication with a first electronic device and a second electronic device via a network, the first electronic device executing a first browser and the second electronic device executing a second browser, the method comprising:
receiving, from the first electronic device, an indication that the first browser obtained a first version of a web resource from a web server;
receiving, from the second electronic device, an indication that the second browser obtained a second version of the web resource from the web server, the second version of the web resource being different from the first version of the web resource and the web server being different from the browser coordination server;
determining that the second version of the web resource is an updated version of the web resource relative to the first version of the web resource; and
sending, to the first electronic device, an indication that the first version of the web resource is out of date.

2. The method of claim 1, wherein the indication that the first version of the web resource is out of date comprises a trigger operable to cause the first electronic device to notify a user of the first electronic device that the first version of the web resource is out of date.

3. The method of claim 1, wherein the indication that the first version of the web resource is out of date comprises a trigger operable to cause the first electronic device to obtain a most recent version of the web resource from the web server.

4. The method of claim 3, wherein the trigger is operable to cause the first electronic device to obtain the most recent version of the web resource from the web server only after having prompted the user whether or not to obtain the most recent version of the web resource from the web server, and receiving a positive indication from the user.

5. The method of claim 3, wherein the trigger is further operable to cause the first electronic device to display the most recent version of the web resource to the user via a display of the first electronic device only after having prompted the user whether or not to display the most recent version of the web resource.

6. The method of claim 1, wherein the indication that the first version of the web resource is out of date comprises an indication that the second version of the web resource is obtainable from the web server.

7. The method of claim 1, further comprising obtaining the second version of the web resource from one of the web server and the second electronic device; and wherein sending the indication that the first version of the web resource is out of date comprises sending the second version of the web resource obtained from the one of the web server and the second electronic device.

8. The method of claim 1, further comprising:
receiving, from the first electronic device, an indication that the first browser obtained a third version of the web resource from the web server;
determining that the third version of the web resource is an updated version of the web resource relative to the second version of the web resource; and
sending, to the second electronic device, an indication that the second version of the web resource is out of date.

9. The method of claim 1, further comprising:
receiving, from the second electronic device, an indication that the second browser obtained a third version of the web resource from the web server;
determining that the third version of the web resource is an updated version of the web resource relative to the second version of the web resource; and
sending, to the first electronic device, an indication that the second version of the web resource is out of date.

10. The method of claim 1, wherein:
the first browser obtained the first version of the web resource from the web server without obtaining the first version of the web resource via the browser coordination server; and
the second browser obtained the second version of the web resource from the web server without obtaining the second version of the web resource via the browser coordination server.

11. The method of claim 10, further comprising:
receiving, from the first electronic device, an indication that the first browser obtained a third version of the web resource from the web server, the first browser having obtained the third version of the web resource without obtaining the third version of the web resource via the browser coordination server;
determining that the third version of the web resource is an updated version of the web resource relative to the second version of the web resource; and
sending, to the second electronic device, an indication that the second version of the web resource is out of date.

12. The method of claim 10, further comprising:
receiving, from the second electronic device, an indication that the second browser obtained a third version of the web resource from the web server, the second browser having obtained the third version of the web resource without obtaining the third version of the web resource via the browser coordination server;
determining that the third version of the web resource is an updated version of the web resource relative to the second version of the web resource; and
sending, to the first electronic device, an indication that the second version of the web resource is out of date.

13. The method of claim 10, wherein determining that the second version of the web resource is an updated version of the web resource relative to the first version of the web resource comprises:
determining that the first browser obtained the first version of the web resource at a first time;
determining that the second browser obtained the second version of the web resource at a second time later than the first time; and
determining that the second version of the web resource differs from the first version of the web resource.

14. The method of claim 13, wherein:
receiving the indication that the first browser obtained the first version of the web resource comprises receiving a first browser log of the first browser;
receiving the indication that the second browser obtained the second version of the web resource comprises receiving a second browser log of the second browser; and
determining that the second version of the web resource differs from the first version of the web resource comprises comparing the first browser log to the second browser log.

15. The method of claim 13, wherein:
receiving the indication that the first browser obtained the first version of the web resource comprises receiving a hash of the first version of the web resource;
receiving the indication that the second browser obtained the second version of the web resource comprises receiving a hash of the second version of the web resource; and
determining that the second version of the web resource differs from the first version of the web resource comprises determining that the hash of the first version of the web resource differs from the hash of the second version of the web resource.

16. A non-transitory computer-readable medium storing program instructions for coordinating web communications, the program instructions being executable by a browser coordination server in communication with a first electronic device and a second electronic device via a network, the first electronic device executing comprising a first browser and the second electronic device comprising a second browser, the program instructions being executable to effect:
reception, from the first electronic device, of an indication that the first browser obtained a first version of a web resource from a web server;
reception, from the second electronic device, of an indication that the second browser obtained a second version of the web resource from the web server, the second version of the web resource being different from the first version of the web resource and the web server being different from the browser coordination server;
determination that the second version of the web resource is an updated version of the web resource relative to the first version of the web resource; and
sending, to the first electronic device, of an indication that the first version of the web resource is out of date.

17. The medium of claim 16, wherein the indication that the first version of the web resource is out of date comprises a trigger operable to cause the first electronic device to notify a user of the first electronic device that the first version of the web resource is out of date.

18. The medium of claim 16, wherein the indication that the first version of the web resource is out of date comprises a trigger operable to cause the first electronic device to obtain a most recent version of the web resource from the web server.

19. The medium of claim 18, wherein the trigger is operable to cause the first electronic device to obtain the most recent version of the web resource from the web server only after having prompted the user whether or not to obtain the most recent version of the web resource from the web server, and receiving a positive indication from the user.

20. The medium of claim 18, wherein the trigger is further operable to cause the first electronic device to display the most recent version of the web resource to the user via a display of the first electronic device only after having prompted the user whether or not to display the most recent version of the web resource.

* * * * *